Aug. 20, 1940.   H. O. DUERR ET AL   2,212,062
WASTE DESTRUCTOR AND GARBAGE RECLAMATION UNIT
Filed April 16, 1938   4 Sheets-Sheet 1

INVENTORS
Harry O. Duerr
William F. Drew

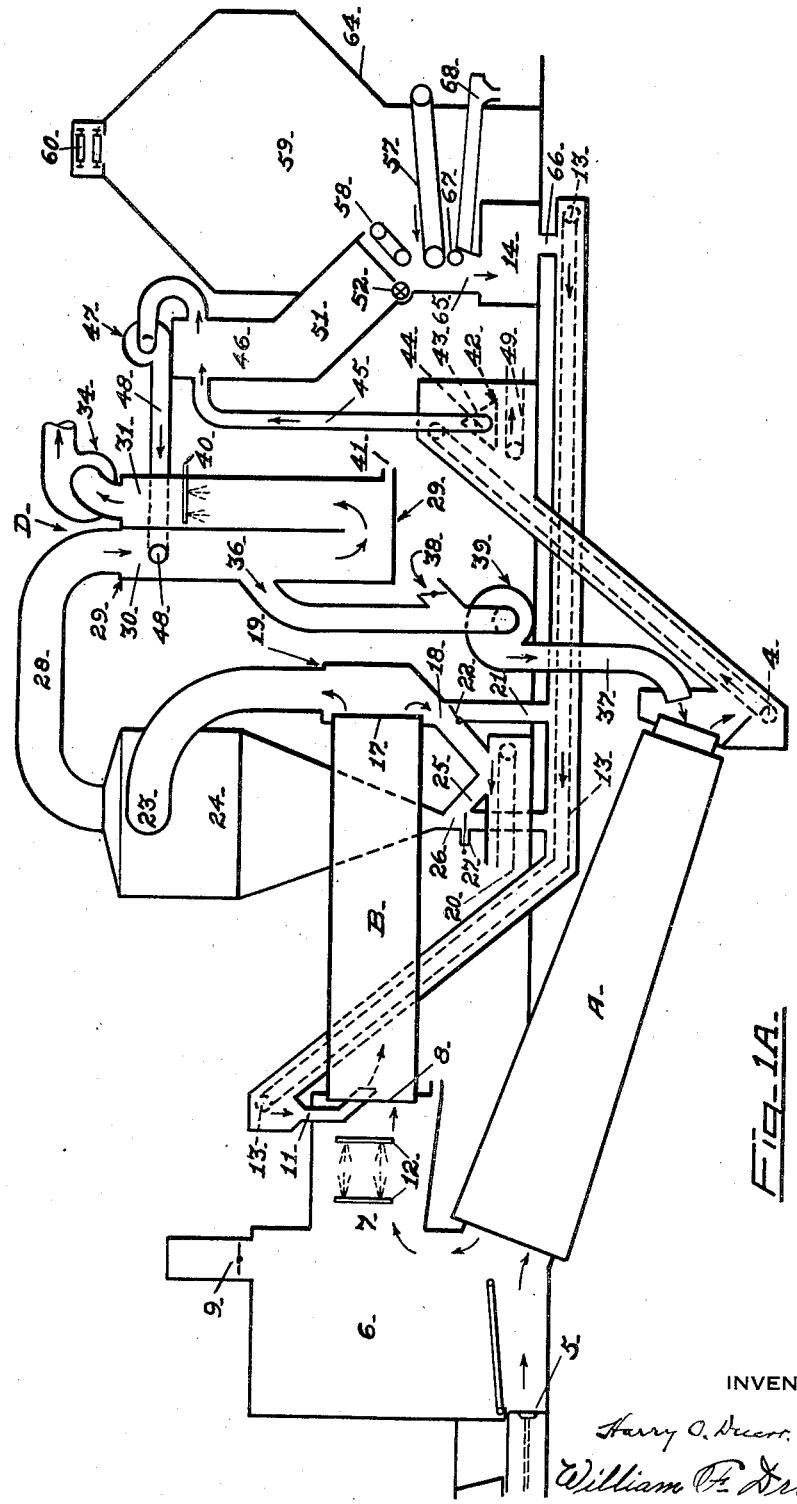

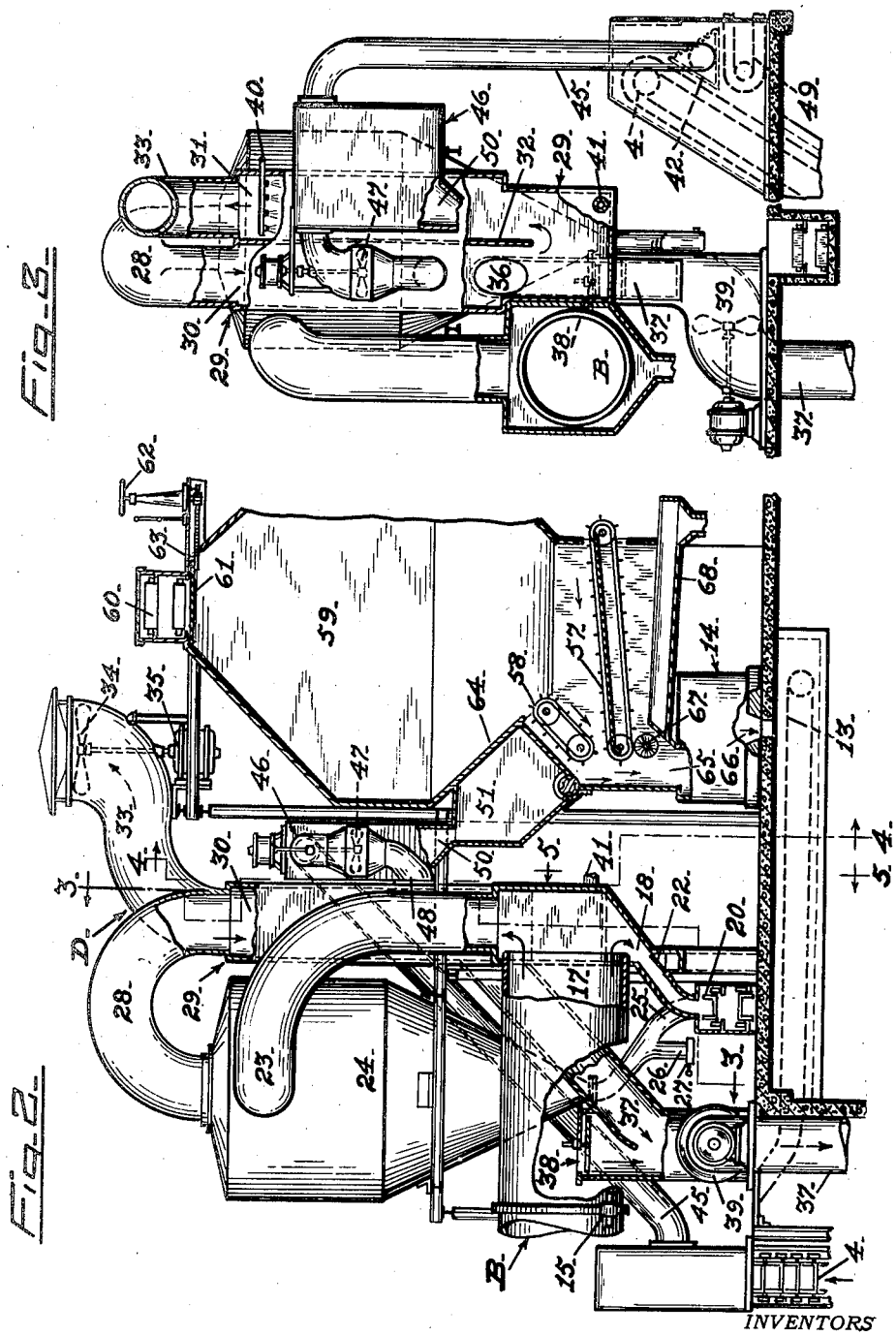

Aug. 20, 1940.   H. O. DUERR ET AL   2,212,062
WASTE DESTRUCTOR AND GARBAGE RECLAMATION UNIT
Filed April 16, 1938   4 Sheets-Sheet 4
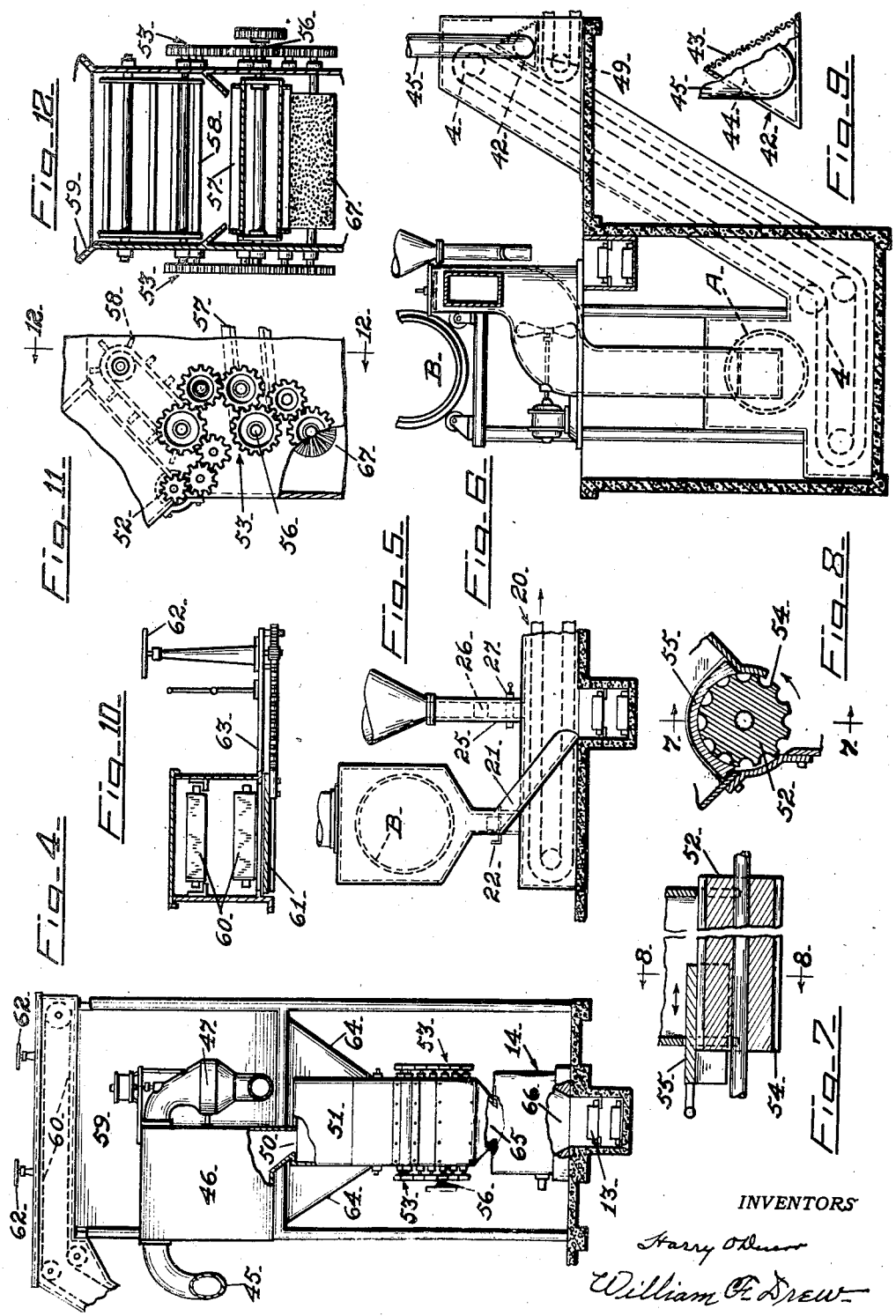
INVENTORS
Harry O Duerr
William F. Drew Patented Aug. 20, 1940

2,212,062

UNITED STATES PATENT OFFICE 2,212,062

WASTE DESTRUCTOR AND GARBAGE RECLAMATION UNIT

Harry O. Duerr and William F. Drew, Los Angeles, Calif.

Application April 16, 1938, Serial No. 202,579

10 Claims. (Cl. 110—14)

The present invention relates to and has for its principal objects the provision of a combined refuse incinerating and garbage salvaging apparatus which as a single unit will afford the two-fold advantage of complete elimination of refuse and the conversion of garbage into a valuable fertilizer product.

One of the objects of the invention is to provide a system and an apparatus of the character described by means of which heat and products of combustion derived from burning waste and refuse matter in an incinerator are utilized to treat and dehydrate garbage whereby to reclaim it as a fertilizer without creating a smoke, dust or objectionable odor nuisance.

Another object hereof is to provide a combined garbage reclaiming and refuse incinerating apparatus which is so constructed, arranged and operated that the incinerating operation is improved by and also improves the garbage recovery operation to the end that such operations are carried out with less cost and more efficiently than possible with separate and non-related incinerating and garbage recovery units.

The invention hereof further resides in the provision of apparatus of the character described wherein a rotary refuse incinerating chamber and a rotary garbage dehydrating chamber are arranged so that certain ends thereof are adjacent one another, said ends being enclosed by a structure which affords the passage of gases and products of combustion of the refuse in the incinerating chamber, into the dehydrating chamber; separate means extend into said structure for continuously feeding refuse to the enclosed end of the incinerating chamber and garbage into the enclosed end of said dehydrating chamber; a forced draft is created in said chambers to promote combustion in the incinerating chamber and induce the flow of garbage and said products of combustion into and through the dehydrating chamber, and a recovery means separates the dehydrated garbage from said products of combustion to thereby reclaim it as a fertilizer. Moreover, the invention has the further purpose of utilizing ashes resulting from incineration of the refuse to treat the garbage to render it better suited for dehydrating and to add to the finished product such fertilizing value as afforded by such ashes; and also includes an efficient means for removing dehydrated particles and dust from the gases of combustion and dehydration so as to prevent the passage of such particles and dust into the atmosphere whereby to effect a thorough recovery of fertilizer values and avoid creating a nuisance.

The invention further resides in the particular construction, combination, interrelation and association of the devices, units, parts and elements of the combined and co-related apparatus for incinerating refuse, dehydrating garbage, treating the garbage before dehydration, treating the ashes of incineration, combining the ashes with the garbage, separately feeding the refuse and garbage to the incinerating and dehydrating chambers, creating the forced draft in said chambers, separating the dehydrated particles and dust from the gases of combustion and dehydration, and removing the treated garbage as a fertilizer.

With the above and other objects in view the invention consists in the novel construction and combination of parts hereinafter described, illustrated in the accompanying drawings, and set forth in the claims hereto appended, it being understood that various changes in form, proportion, size and minor details of construction within the scope of the claims may be resorted to without departing from the spirit or sacrificing any of the advantages of the invention.

In the drawings:

Figure 1A is a schematic diagram of the system.

Figure 2 is an enlarged fragmentary side elevation of units of the apparatus, with parts thereof shown in section.

Figure 3 is a sectional view taken on the plane of line 3—3 of Figure 2.

Figure 4 is a sectional view taken on the plane of line 4—4 of Figure 2.

Figure 5 is a sectional view taken on the plane of line 5—5 of Figure 2.

Figure 6 is a sectional view taken on the plane of line 6—6 of Figure 1.

Figure 7 is a fragmentary sectional view taken on the plane of line 7—7 of Figure 8.

Figure 8 is a sectional view taken on the plane of line 8—8 of Figure 7.

Figure 9 is a fragmentary elevation partly in section of the ash separating and screening device.

Figure 10 is a fragmentary sectional view taken through the top of the garbage bin and showing the means for controlling the feeding of garbage into said bin.

Figure 11 is a fragmentary side view of the drive means for controlling the outlet of the garbage bin.

Figure 12 is a sectional view taken on the plane of line 12—12 of Figure 11.

Figure 1:
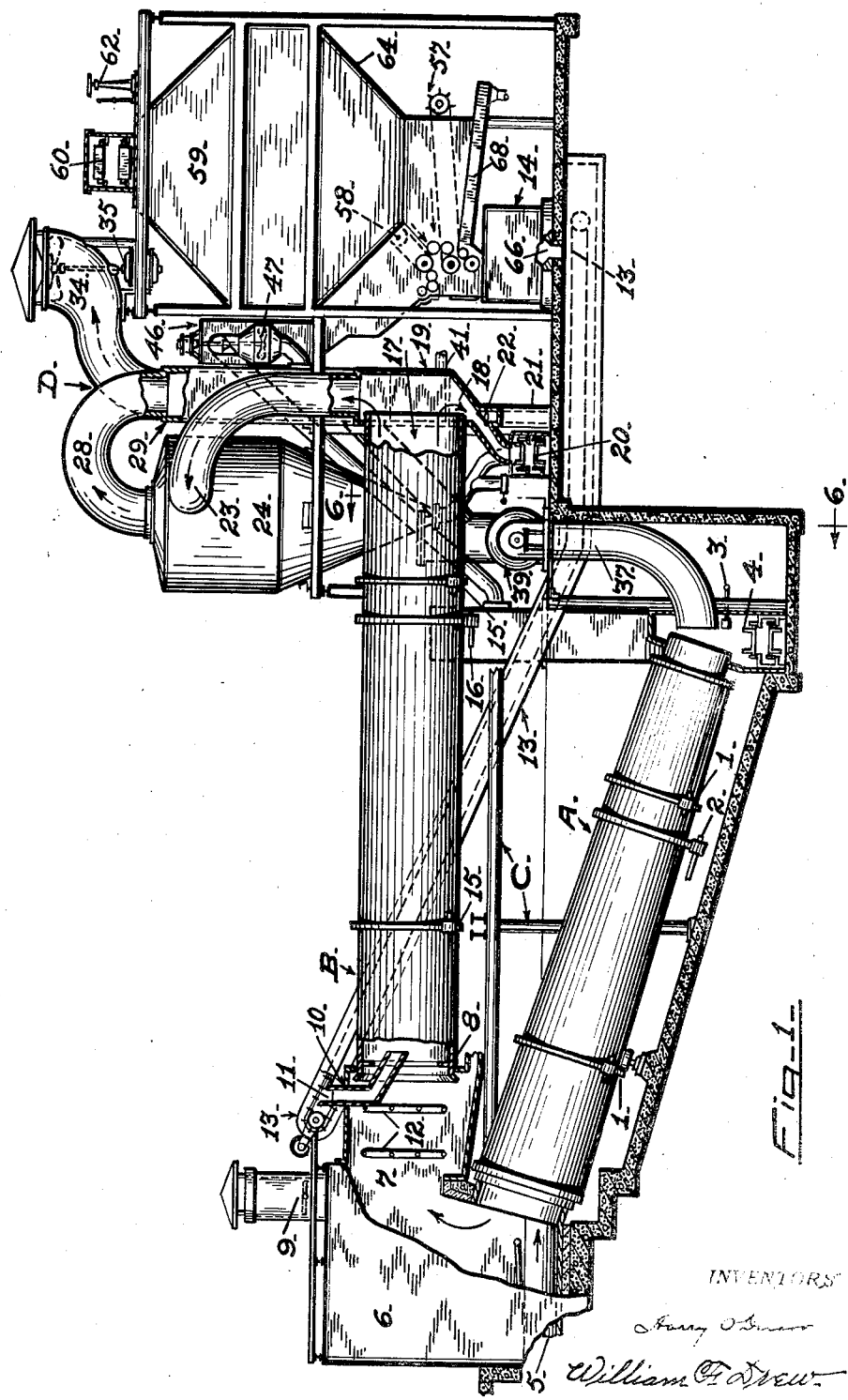
Figure 1 is a longitudinal sectional and side elevational view of the entire apparatus of this invention, with parts broken away and other parts in section and certain parts omitted for clarity of illustration.

The embodiment of the invention shown in the accompanying drawings generally comprises a refuse incinerating chamber A and a garbage dehydrating chamber B, arranged on and supported by a suitable base or foundational structure C and provided with attendant and co-operating devices, elements and parts as will be hereinafter fully described, whereby refuse incinerating and garbage treating and dehydrating operations may be simultaneously carried out to effectively eliminate the refuse and at the same time reclaim the garbage as a valuable fertilizer, all in a much more efficacious and economical manner than heretofore possible, and furthermore, without creating a dust, smoke or odor nuisance.

As here shown the refuse incinerating chamber A is supported by the means 1 in an inclined position and is rotated by means, parts of which are shown at 2, whereby when refuse is fed into the upper end thereof it will gravitate therein while under combustion, there being a suitable burner 3 for supporting combustion in said chamber. Ashes discharging from the lower end of the chamber A will be deposited upon a suitable conveyor means 4 and removed as will be later described.

Refuse from a bin not shown is fed through a bin extension 5 into the upper end of the chamber A, any suitable means being employed to continuously feed the refuse into the chamber.

A structure 6 defines a flue chamber 7 which encloses the upper end of the incinerating chamber A and an adjacent end 8 of the dehydrator chamber B, so that products or gases of combustion from chamber A will be conducted into the chamber B and flow through the latter. However, a damper controlled chimney 9 at the top of structure 6 will afford an outlet for some of the gases of combustion.

The bin extension 5 extends through an opening (not shown) in the lower part of the structure 6 whereas a similar opening 10 in the upper part of the flue structure 7 accommodates an inclined and angular garbage feed chute 11 through which garbage gravitates into the end 8 of the dehydrating chamber B. Disposed in the flue chamber 7 is a spray device 12 for reducing the temperature, humidifying and tempering the gases of combustion before entering the dehydrating chamber thus effecting control of the dehydrating process in relation to any fluctuating heat conditions resulting from incineration in chamber A, and further provides means for preventing destructive temperatures in the chamber B when the incineration process is carried on in the chamber A without the presence of garbage in the chamber B.

Garbage is fed to the chute 11 by a suitable conveyor means 13 leading from a grinder 14 which is employed to reduce the garbage to small and substantially uniform particles.

It is important to note that the dehydrating chamber B is located in vertical alinement with and above the incinerating chamber A in lateral parallelism therewith, to economize space and better establish the co-operative actions of said two chambers. As here shown the chamber B is horizontal but not necessarily so, and is rotatably mounted on the conventional supporting devices 15 and driven by means parts of which are shown at 16.

Any suitable means may be used for causing the flow of garbage and gases of combustion through the dehydrating chamber B, but as here shown we prefer the use of a combined forced draft creating and separator means generally designated D which is connected with the outlet end 17 of said chamber B.

These means serve the fivefold purpose as to first, create a regulatable forced draft in the chambers A, 7 and B; second, promote incineration in chamber A; third, cause the garbage and commingled gases of combustion to be drawn through the dehydrating chamber B; fourth, recover both the coarse and fine particles of the dehydrated garbage from the said gases and fifth, effect precipitation of the highly comminuted particles of both the gases and dehydrated garbage as odor carriers. With this means D it is seen that the flow of hot gases of combustion and garbage is induced through the chamber B while the latter is rotated and the garbage particles are agitated due to such rotation, and therefore the commingled garbage and hot gases cause an effectual dehydration of the garbage during the passage thereof through said chamber.

Heavier particles of garbage discharging from the outlet end 17 of the chamber B will gravitate through a chute 18 extending from the lower side of a housing structure 19 which encloses said end of said chamber. This chute 18 discharges onto a conveyor 20 for disposition of this grade of the dehydrated garbage for use as a fertilizer. A by-pass chute 21, Figures 1 and 5, controlled by a valve 22 permits of discharging the garbage from the chute 18 onto the conveyor 13 and reconveying it to the dehydrating chamber B should the garbage require further drying.

Lighter particles of dehydrated garbage pass with the gases of combustion through the pipe 23 leading from the housing 19 to the cyclone or other conventional separator chamber 24 and are therein separated from the products of combustion by gravitational, centrifugal or other forces and drop from the chamber 24 through a chute 25, Figure 2, onto the recovery or take-off conveyor 20. A by-pass chute 26 extending from chute 25 and controlled by a valve 27 provides for directing improperly or insufficiently dried particles from the chute 26 onto the conveyor 13 whereby to be returned to the dehydrating chamber B for further treatment.

Gases of combustion and extremely light particles not separated in the cyclone separator or chamber 24 will pass out from the top of the latter through a pipe 28 into the top of a settling chamber 29. As here shown the chamber 29, Figure 3, is divided into passages or sections 30 and 31 by a partition 32 and the gases are drawn downwardly in the passage 30 and then under the partition and upwardly through passage 31 and pass out through a pipe 33 to the atmosphere. At the outlet of the pipe 33 is a suitable exhaust fan 34 operated by a motor 35 so as to create a forced draft in the chambers A and B and throughout the entire system whereby to induce the flow of gases and garbage as hereinbefore described.

The settling chamber 29 is provided with an outlet 36, Figure 3, so that a desired quantity of the gases and heat value therein may be drawn off and utilized to pre-heat the supplemental fresh air supply to the incinerating chamber A. The outlet 36 is connected to the chamber A by the pipe line 37 which is provided with the supplemental fresh air intake 38 and also embodies the blower 39 operating to force the gas and air mixture into the chamber A. Thus it is seen that the blower 39 as well as the exhaust fan 34 creates a forced draft in the chambers A and B and throughout the system. The gases discharged through the passage 31 in the settling chamber 29 are sprayed with water from a spray head 40, Figure 3, in the upper end of said passage and the dust and fine dehydrated particles in the gases will be precipitated and drain with the water through an outlet 41 to a suitable settling basin (not shown) for reclamation or other disposal. In this manner the fine garbage particles and dust are removed from the gases of combustion and a dust and odor nuisance is prevented while the fertilizer values otherwise carried off by the escaping gases of combustion are salvaged.

In accordance with this invention ashes of combustion from the incinerating chamber A are used to treat the garbage and to add to the fertilizing value thereof, by being mixed with the garbage in the grinder 14, yet it is to be understood that lime or any other substance for the same purpose may be added, either into the garbage while in the grinder or otherwise, the purpose being that of preventing the "balling up" of the garbage and render it more "granular" in form for drying action as well as add a fertilizing element to the garbage mixture. As here provided the conveyor 4, Figures 6, 9 and 3, conveys the ashes and non-combustibles upwardly from the discharge end of the chamber A and drops them so as to pass in front of an air inlet header or separator 42 which as here shown is triangular in cross section and has a screen 43 serving as one side thereof, the other walls being imperforate except for an outlet 44 to which a pipe 45 is connected. Ashes of certain size, dependent on the mesh of the screen 43 are drawn into the hollow ash separator and are carried upwardly through the pipe 45 into the multiclone or equivalent conventional separating device or chamber 46, by the action of motor driven exhauster fan 47 connected as shown in Figure 3 with said chamber 46. The outlet of this exhauster fan is connected as at 48 with and discharges into the passage 30 of the settling chamber 29, and is thus arranged to flow the very fine ashes and dust which may be drawn by said fan from the chamber 46, downwardly in said settling chamber. This disposition of the exhaust air from the fan 47 also serves to augment the forced draft in the system, particularly in the dehydrator B, and also causes the ash dust to be sprayed and precipitated as it passes up through the passage 31 with the gases of combustion, said precipitated ash dust draining with the dust and particles drawn from chamber B, out through the pipe 41 as previously described. The residue of ashes and non-combustible matter not entering the header 42, drop onto the conveyor 49, Figures 3 and 6, which removes them from the system. The ashes thus deposited in chamber 46 gravitate through an opening 50, Figures 2 and 4, in the lower end of said chamber into an ash hopper 51 from which ashes are deposited into the garbage through a measuring discharge valve 52, Figures 8, 7 and 11. This valve is rotated by the gear train 53 and is provided with peripherally longitudinal grooves 54 which dump predetermined amounts of ashes at predetermined intervals into the garbage being fed to the grinder 14. The amount of ashes discharged by the valve 52 is also subject to variation by a manually operable slide valve 55 adjustable to cover portions of the upper side of the valve 52.

The gear train 53 is driven by a suitable drive, not shown, connected to the shaft 56 and also operates the conveyors 57 and 58 for controlling the feed of garbage from the storage bin 59 to the grinder 14.

As here shown the bin 59 is supplied with garbage by the drag conveyor means 60 and as shown in, Figures 10, 4 and 2, the upper side of the bin is provided with intake openings controlled by gates 61 which are opened and closed by manually operable means 62. A walk 63 on the top of the bin enables an operator to operate the several gates to evenly distribute the garbage in the bin as it is fed thereto by the conveyor 60. As the lower end of the bin is open the lower part of the mass of garbage therein rests on the conveyor 57 but the bin has convergent bottom walls 64 to relieve the conveyor of most of the weight of the stored mass. As the conveyors 57 and 58 operate, the garbage is fed between them and drops through the passage 65, Figures 2 and 4, into the grinder 14, in metered quantities, while at the same time measured amounts of ashes are deposited by the valve 52 into the mass dropping through the passage 65, and upon reduction, in the grinder or hammer mill, to particles of desired size then drops through the opening 66 onto the conveyor 13 and is fed into the dehydrating chamber B. A brush 67 driven by the gear train 53 operates to clean the conveyor 57 at the lower end of the lower run thereof. Beneath the conveyor 57 is a drain trough 68 for carrying off the free liquid draining from the garbage in storage in the bin 59 and the conveyor 57.

The ashes, lime or the like serve to prevent lumping of the garbage when ground into small particles and keeps them substantially separate and free from adhesive action in the initial stages of the dehydrating process.

It will now be seen that the invention hereof through the combination of refuse incineration and garbage dehydration operation provides for a new and efficient method of incinerating waste and refuse matter and producing a valuable fertilizer with a saving in incinerating costs in consideration of the value of the fertilizer product as derived from waste matter.

We claim:

1. A refuse incinerating and garbage salvaging apparatus, including a rotary incinerating chamber for refuse, a rotary garbage dehydrating chamber having one end located adjacent to one end of said incinerating chamber, a communicating chamber enclosing said ends and affording the passage of gases of combustion from said end of the incinerating chamber into said end of the dehydrating chamber, means within said communicating chamber affording the feeding of refuse into said end of said incinerating chamber, other means within said communicating chamber affording the feed of garbage into said end of said dehydrating chamber, means for creating a forced draft in said chambers for inducing the passage of garbage and said gases of combustion through said dehydrating chamber, and means for recovering dehydrated garbage as it is drawn from said dehydrating chamber by said draft creating means.

2. A refuse incinerating and garbage salvaging apparatus, including a rotary inclined refuse incinerating chamber, a rotary garbage dehydrating chamber having one end located adjacent and above the upper end of said incinerating chamber, a communicating chamber enclosing said ends for affording the passage of gases of combustion from the incinerating chamber to the dehydrating chamber means cooperating with said communicating chamber for feeding refuse and garbage into the incinerating and dehydrating chambers respectively, means connected with the other end of said dehydrating chamber for creating a forced draft in all of said chambers for promoting combustion in said incinerating chamber and inducing a flow of garbage and gases of combustion through said dehydrating chamber and separator means associated with said draft creating means for recovering in a dry state the garbage which is removed from said dehydrating chamber by said draft creating means.

3. A refuse incinerating and garbage salvaging apparatus, including a rotary inclined refuse incinerating chamber, a rotary garbage dehydrating chamber having one end located adjacent and above the upper end of said incinerating chamber, a communicating chamber enclosing said ends for affording the passage of gases of combustion from the incinerating chamber to the dehydrating chamber and the feeding of refuse and garbage through said ends into the respective chambers, separate means associated with said communicating chamber for feeding refuse and garbage through said ends and in the same direction into the respective chambers, means connected with the other end of said dehydrating chamber for creating a forced draft in said chambers and said structure for promoting combustion in said incinerating chamber and inducing a flow of garbage and gases of combustion through said dehydrating chamber and separator means associated with said draft creating means for recovering in a dry state the garbage which is removed from said dehydrating chamber by said draft creating means, and conveyor means for removing said recovered dehydrated garbage.

4. A refuse incinerating and garbage salvaging apparatus, including a rotary inclined refuse incinerating chamber, a rotary garbage dehydrating chamber having one end located adjacent and above the upper end of said incinerating chamber, a communicating chamber enclosing said ends for affording the passage of gases of combustion from the incinerating chamber to the dehydrating chamber and the feeding of refuse and garbage through said ends into the respective chambers, separate means associated with said communicating chamber for feeding refuse and garbage through said ends into the respective chambers, means connected with the other end of said dehydrating chamber for creating a forced draft in said chambers and said structure for promoting combustion in said incinerating chamber and inducing a flow of garbage and gases of combustion through said dehydrating chamber and separator means associated with said draft creating means for recovering dehydrated garbage which is removed from said dehydrating chamber by said draft creating means, and conveyor means for removing said recovered dehydrated garbage, means for recovering ashes from said incinerating chamber, and means for admixing said ashes with said garbage before dehydration thereof.

5. Apparatus for incinerating refuse and dehydrating and salvaging garbage, including a rotary inclined refuse incinerating chamber adapted to have refuse fed into the upper end thereof, a rotary garbage dehydrating chamber mounted over and having one end disposed adjacent said upper end of the incinerating chamber, a communicating chamber enclosing said ends of said chambers for affording the passage of products of combustion from the upper end of said incinerating chamber into the adjacent end of said dehydrating chamber, separate means extending into said communicating chamber for feeding refuse into the upper end of said incinerating chamber and garbage into said adjacent end of said dehydrating chamber, means connected with the other end of said dehydrating chamber for creating a forced draft in said chambers and said structure for inducing a flow of garbage and said products of combustion through said dehydrating chamber, and means associated with said draft creating means for recovering the dehydrated garbage withdrawn by said draft creating means from said dehydrating chamber, including a separator chamber having an inlet between its ends, a gas outlet at its upper end, and an outlet for dehydrated garbage at its lower end.

6. Apparatus for incinerating refuse and dehydrating and salvaging garbage, including a rotary inclined refuse incinerating chamber adapted to have refuse fed into the upper end thereof, a rotary garbage dehydrating chamber mounted over and having one end disposed adjacent said upper end of the incinerating chamber, a communicating chamber enclosing said ends of said chambers for affording the passage of products of combustion from the upper end of said incinerating chamber into the adjacent end of said dehydrating chamber, separate means extending into said communicating chamber for feeding refuse into the upper end of said incinerating chamber and garbage into said adjacent end of said dehydrating chamber, means connected with the other end of said dehydrating chamber for creating a forced draft in said chambers and said structure for inducing a flow of garbage and said products of combustion through said dehydrating chamber, and means associated with said draft creating means for recovering the dehydrated garbage withdrawn by said draft creating means from said dehydrating chamber, including a separator chamber having an inlet between its ends, a gas outlet at its upper end, and an outlet for dehydrated garbage at its lower end, a settling chamber into which the gases are discharged from said separator chamber gas outlet, a partition in said settling chamber, said settling chamber having an outlet on one side of said partition, a conduit communicating said last named outlet directly with the other end of said incinerating chamber, a blower for forcing gases through said conduit into said incinerating chamber, said settling chamber having a gas outlet to the atmosphere, and means on the other side of said partition for spraying the gases with liquid prior to discharge thereof through said last named gas outlet.

7. The method of incinerating refuse and treating garbage to produce a fertilizer, which method includes the steps of simultaneously incinerating refuse matter and dehydrating garbage by continuously introducing into the presence of garbage hot gases of combustion derived from continuous incineration of refuse, mixing ash, resulting from combustion of said refuse, with garbage, before said introduction of said gases to the presence of the garbage, and then separating the dehydrated garbage and said gases of combustion to recover in a dry state the dehydrated garbage and the ash contained therein, as a fertilizer.

8. Refuse incinerating and garbage treating and salvaging apparatus including a refuse incinerating chamber, a garbage dehydrating chamber, a communicating chamber enclosing certain ends of said chambers and affording the passage of gases of combustion from the incinerating chamber into said dehydration chamber, means in said communicating chamber for affording the feeding of refuse and garbage into the incinerating and dehydrating chambers respectively, and means associated with said dehydrating chamber for separating dehydrated garbage from said gases of combustion and clarifying said gases.

9. A refuse incinerating and garbage salvaging apparatus, including a rotary incinerating chamber for refuse, a rotary garbage dehydrating chamber having one end located adjacent to one end of said incinerating chamber, a communicating chamber enclosing said ends and affording the passage of gases of combustion from said end of the incinerating chamber into said end of the dehydrating chamber, means within said communicating chamber affording the feeding of refuse into said end of said incinerating chamber, and other means within said communicating chamber affording the feeding of garbage into said end of said dehydrating chamber.

10. The method of incinerating refuse and treating garbage to produce a fertilizer, which method includes the steps of simultaneously incinerating refuse matter and dehydrating garbage by continuously introducing into the presence of garbage, hot gases of combustion derived from continuous incineration of refuse; mixing ash resulting from combustion of said refuse with garbage and grinding the mixture before said introduction of said gases to the presence of the garbage, and then separating the dehydrated garbage and said gases of combustion to recover in a dry state, the dehydrated garbage and the ash contained therein, as a fertilizer.

HARRY O. DUERR.
WILLIAM F. DREW.